US012639232B2

(12) United States Patent
Lim

(10) Patent No.: US 12,639,232 B2
(45) Date of Patent: May 26, 2026

(54) DATA STORAGE APPARATUS GUARANTEEING PROGRAM SEQUENCE AND OPERATING METHOD THEREOF

(71) Applicant: SK hynix Inc., Gyeonggi-do (KR)

(72) Inventor: Min Sik Lim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/653,983

(22) Filed: May 3, 2024

(65) Prior Publication Data

US 2025/0173274 A1 May 29, 2025

(30) Foreign Application Priority Data

Nov. 29, 2023 (KR) ........................ 10-2023-0169744

(51) Int. Cl.
*G06F 12/12* (2016.01)
*G06F 11/07* (2006.01)
*G06F 12/1009* (2016.01)

(52) U.S. Cl.
CPC ........ *G06F 12/1009* (2013.01); *G06F 11/073* (2013.01); *G06F 12/12* (2013.01)

(58) Field of Classification Search
CPC ..... G06F 12/1009; G06F 11/073; G06F 12/12
See application file for complete search history.

(56) References Cited

U.S. PATENT DOCUMENTS 8,397,024 B2 3/2013 Fasoli et al.
2020/0026464 A1* 1/2020 Yen .................... G06F 12/1009

2020/0218465 A1* 7/2020 Klein .................. G06F 12/1009
2020/0327065 A1* 10/2020 Jung ....................... G06F 9/485
2021/0263844 A1* 8/2021 Lee ..................... G06F 13/1673
2022/0292029 A1 9/2022 Jang
2024/0143207 A1* 5/2024 Vaideeswaran ........ G11C 29/52

FOREIGN PATENT DOCUMENTS

KR 10-2020-0120113 A 10/2020
KR 10-2395538 B1 5/2022

OTHER PUBLICATIONS

Sungmin Park, Hoyoung Jung, Hyoki Shim, Sooyong Kang, & Jaehyuk Cha. (2008). Write Buffer-aware Address Mapping for NAND Flash Memory Devices. 2008 IEEE International Symposium on Modeling, Analysis and Simulation of Computers and Telecommunication Systems, 1-2. (Year: 2008).*

* cited by examiner

*Primary Examiner* — Reginald G Bragdon
*Assistant Examiner* — Zakaria Mohammed Belkhayat
(74) *Attorney, Agent, or Firm* — IP & T GROUP LLP

(57) ABSTRACT

A data storage apparatus may include a storage device; a buffer memory device configured to temporarily store write data and a mapping table; and a memory controller configured to control the storage device to program the write data. The memory controller is configured to when externally receiving write commands including a logical addresses, store the logical addresses by mapping the logical addresses to physical addresses sequentially stored in the mapping table in a sequence in which the write commands are received, and when a program operation corresponding to a first write command fails, invalidate first mapping information corresponding to the first write command and update the first mapping information by allocating a new physical address to a logical addresses including the first write command in response to a reprogram command generated with respect to the first write command.

9 Claims, 13 Drawing Sheets

| | |
|---|---|
| INDEX1 | DATA 1 |
| INDEX2 | DATA 3 |
| INDEX3 | DATA 5 |
| INDEX4 | DATA 7 |
| INDEX5 | DATA 4 |
| INDEX6 | DATA 8 |
| INDEX7 | DATA 6 |
| INDEX8 | DATA 2 |

1253

| INDEX | STATUS | DATA |
|---|---|---|
| 1 | 1 | DATA 1 |
| 2 | 1 | DATA 3 |
| 3 | 1 | DATA 5 |
| 4 | 1 | DATA 7 |
| 5 | 1 | DATA 4 |
| 6 | 1 | DATA 8 |
| 7 | 1 | DATA 6 |
| 8 | 1 | DATA 2 |

| | |
|---|---|
| INDEX1 | DATA 1 |
| INDEX2 | DATA 3 |
| INDEX3 | DATA 5 |
| INDEX4 | DATA 7 |
| INDEX5 | DATA 4 |
| INDEX6 | DATA 8 |
| INDEX7 | DATA 6 |
| INDEX8 | |

1263

| INDEX | STATUS | DATA |
|---|---|---|
| 1 | 1 | DATA 1 |
| 2 | 1 | DATA 3 |
| 3 | 1 | DATA 5 |
| 4 | 1 | DATA 7 |
| 5 | 1 | DATA 4 |
| 6 | 1 | DATA 8 |
| 7 | 1 | DATA 6 |
| 8 | 0 | NULL |

| | |
|---|---|
| INDEX1 | DATA 1 |
| INDEX2 | DATA 3 |
| INDEX3 | DATA 5 |
| INDEX4 | DATA 7 |
| INDEX5 | DATA 4 |
| INDEX6 | DATA 8 |
| INDEX7 | DATA 6 |
| INDEX8 | DATA 9 |

1273

| INDEX | STATUS | DATA |
|---|---|---|
| 1 | 1 | DATA 1 |
| 2 | 1 | DATA 3 |
| 3 | 1 | DATA 5 |
| 4 | 1 | DATA 7 |
| 5 | 1 | DATA 4 |
| 6 | 1 | DATA 8 |
| 7 | 1 | DATA 6 |
| 8 | 1 | DATA 9 |

100-1

DATA STORAGE APPARATUS GUARANTEEING PROGRAM SEQUENCE AND OPERATING METHOD THEREOF

CROSS-REFERENCES TO RELATED APPLICATION

The present application claims priority under 35 U.S.C. § 119(a) to Korean Patent Application No. 10-2023-169744, filed on Nov. 29, 2023, which is incorporated herein by reference in its entirety.

BACKGROUND

1. Technical Field

Various embodiments of the present disclosure relate to a semiconductor integrated device, and more particularly, to a data storage apparatus that corrects a program sequence and an operating method thereof.

2. Related Art

A computer system uses a buffer memory to reduce a bottleneck phenomenon attributable to a difference between the operation speeds of devices that transmit and receive data to each other.

A data storage apparatus that performs data input and output operations in response to a request from an external device uses a volatile or nonvolatile memory device as a storage medium. An issue due to difference between data transfer speeds of devices included in the data storage apparatus may be resolved by adopting a buffer memory thereto.

The data storage apparatus needs to store, in a storage device, data that have been buffered in the buffer memory according to a write sequence that is requested by the external device.

SUMMARY

In an embodiment, a data storage apparatus may include a storage device; a buffer memory device configured to temporarily store write data and a mapping table; and a memory controller configured to control the storage device to program the write data. The memory controller is configured to when externally receiving write commands including a logical addresses, store the logical addresses by mapping the logical addresses to physical addresses sequentially stored in the mapping table in a sequence in which the write commands are received, and when a program operation corresponding to a first write command fails, invalidate first mapping information corresponding to the first write command and update the first mapping information by allocating a new physical address to a logical addresses including the first write command in response to a reprogram command generated with respect to the first write command.

In an embodiment, an operating method of a data storage apparatus may include temporarily storing, by a memory controller, write data and a mapping table in a buffer memory device in response to write commands including a logical addresses that are externally received; storing, by the memory controller, logical addresses by mapping the logical addresses to physical addresses sequentially stored in the mapping table in a sequence in which the write commands are received; controlling, by the memory controller, a storage device to program the write data; invalidating, by the memory controller, first mapping information corresponding to a first write command according to a determination that a program operation corresponding to the first write command fails; and updating, by the memory controller, the first mapping information by allocating a new physical address to a logical addresses including the first write command in response to a reprogram command generated with respect to the first write command.

In an embodiment, a data storage apparatus may include a storage device including a plurality of memory blocks; a buffer memory device configured to temporarily store first write data and second write data; a buffer manager configured to manage the buffer memory device in a scatter-gather way; and a memory controller. The memory controller is configured to control the storage device to program the first write data and the second write data that are sequentially provided, invalidate first mapping information corresponding to the first write data when the program of the first write data fails and the program of the second write data is successful, and update the first mapping information by allocating a new block into which the first data are to be reprogrammed.

According to embodiments of the present disclosure, only a program operation that has failed can be selectively performed again, and a program sequence that has been requested by an external device can also be guaranteed.

BRIEF DESCRIPTION OF THE DRAWINGS

FIG. 1 is a diagram illustrating a configuration of a data storage apparatus according to an embodiment of the present disclosure.

FIGS. 2A to 2C are diagrams for describing a buffer management method using a scatter-gather buffer way according to an embodiment of the present disclosure.

DETAILED DESCRIPTION

Figure 3:
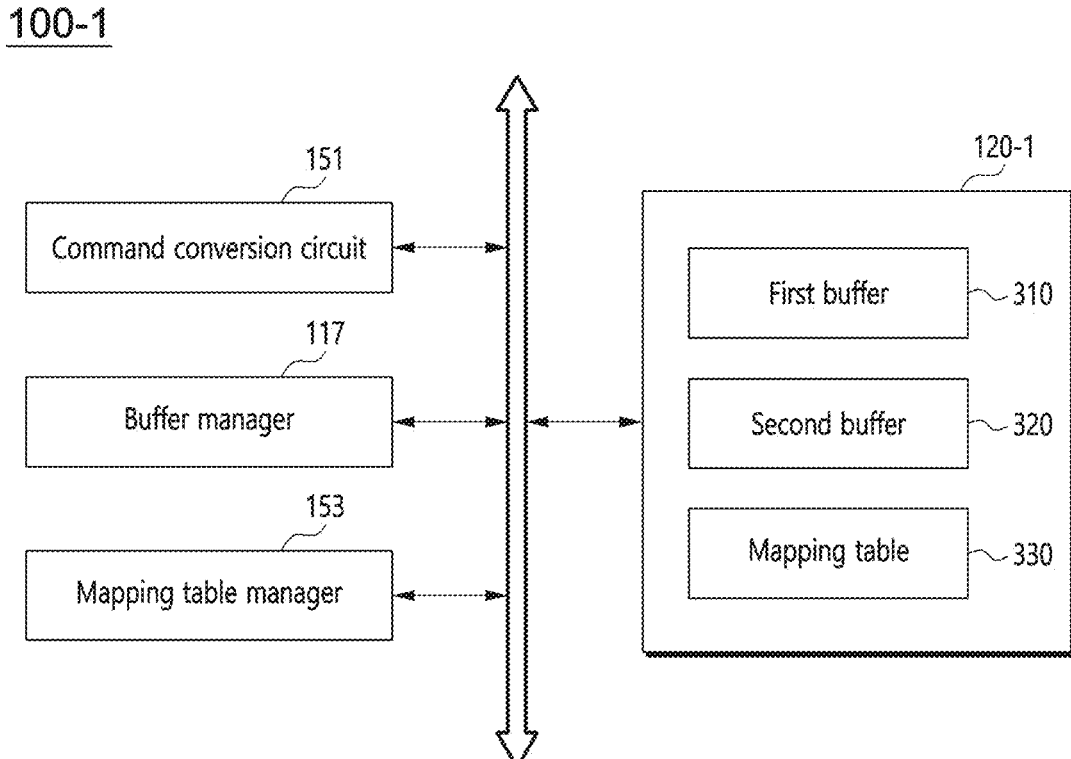
FIG. 3 is a diagram illustrating a configuration of a memory controller according to an embodiment of the present disclosure.

Hereinafter, embodiments of the present disclosure will be described in detail with reference to the accompanying drawings.

Figure 1:
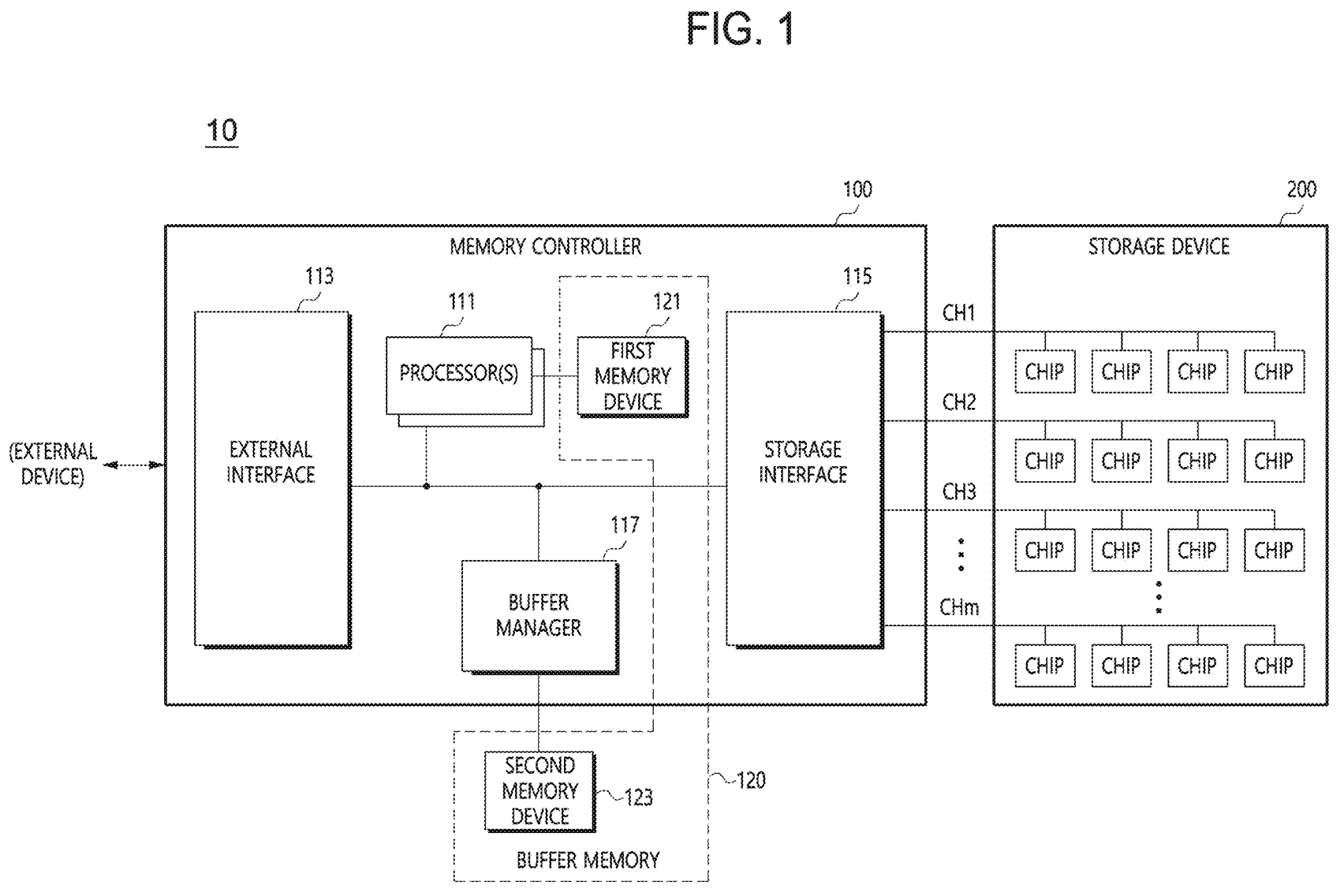

FIG. 1 is a diagram illustrating a configuration of a data storage apparatus 10 according to an embodiment of the present disclosure.

Referring to FIG. 1, the data storage apparatus 10 may include a memory controller 100 and a storage device 200.

The data storage apparatus 10 may be electrically coupled to an external device (e.g., a host), and may exchange data with the external device.

The external device may be selected from among various types of computing systems, such as a personal computer, a laptop computer, a server computer, a workstation, a tablet PC, a drone, an advanced drivers assistance system (ADAS), smart TV, a smartphone, a medical device, an image display device, a measuring device, an Internet of Things (IoT) device.

The storage device 200 may include at least one of a volatile memory device and a nonvolatile memory device. The storage device 200 may be coupled to the memory controller 100 through a plurality of channels CH1, CH2, CH3 to CHm, and may include a plurality of memory chips CHP or a plurality of packages. The memory chip CHP may include a plurality of memory dies. Each of the memory dies may include one or more planes. Each of the planes may include one or more memory blocks. Each of the memory blocks may consist of a plurality of pages. A physical address may be allocated to a memory region that constitutes the storage device 200, for example, a page, a block, a plane, or a die.

The memory controller 100 may control the storage device 200 in response to an external request. For example, the memory controller 100 may enable data to be programmed into the storage device 200 in response to a write request from the outside. The memory controller 100 may read data that have been written in the storage device 200 and provide the read data to the outside, in response to a read request from the outside.

The memory controller 100 may include at least one processor 111, an external interface 113, a storage interface 115, a buffer manager 117, a first memory device 121, and a second memory device 123. The first memory device 121 and the second memory device 123 may be collectively called a buffer memory device 120.

The processor 111 may be configured to operate on hardware when the processor 111 executes firmware or software that is provided for various operations of the data storage apparatus 10. The processor 111 may be implemented in a form in which hardware and firmware or software that operates on the hardware have been combined. In an embodiment, the processor 111 may perform a function of a flash translation layer (FTL) for managing the storage device 200, for example, address mapping, block management, garbage collection, or wear leveling.

The external interface 113 may receive a command and a clock signal from the external device and provide a communication channel for controlling the input and output of data, under the control of the processor 111. Particularly, the external interface 113 may provide a physical connection between the external device and the data storage apparatus 10.

The external interface 113 may temporarily store write data that are provided by the external device in the buffer memory device 120, which is selected from among the first memory device 121 and the second memory device 123, under the control of the processor 111. Furthermore, the external interface 113 may provide the external device with read data that are read from the storage device 200 and that are temporarily stored in the buffer memory device 120.

In an embodiment, the external interface 113 may communicate with the external device based on an interface that uses at least one of various communication standards or interfaces, such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA (SATA) protocol, a parallel-ATA (PATA) protocol, a small computer small interface (SCSI) protocol, an enhanced small disk interface (ESDI) protocol, an integrated drive electronics (IDE) protocol, a private protocol, a system management bus (SMBus) protocol, an inter-integrated circuit (I2C) protocol, and an improved inter-integrated circuit (I3C) protocol.

The storage interface 115 may provide a communication channel for the transmission and reception of signals between the memory controller 100 and the storage device 200. The storage interface 115 may write, in the storage device 200, data that have been temporarily stored in the buffer memory device 120 under the control of the processor 111. Furthermore, the storage interface 115 may temporarily store read data that are read from the storage device 200 in the buffer memory device 120 by delivering the read data to the buffer memory device 120 under the control of the processor 111.

The buffer manager 117 may be configured to control the buffer memory device 120 under the control of the processor 111.

The buffer manager 117 may divide the buffer memory device 120 into a plurality of regions (or slots), and may allocate or release each of the regions in order to temporarily store data. Allocating a region may mean the state in which data have been stored in a corresponding region or the state in which data stored in a corresponding region is valid. Releasing a region may mean the state in which data have not been stored in a corresponding region or the state in which data stored in a corresponding region have been invalidated. In the following description, deleting data stored in the buffer memory device 120 and releasing a slot of the buffer memory device 120 may be used as having the same meaning.

The first memory device 121 may be provided inside the memory controller 100. The second memory device 121 may be provided outside the memory controller 100. In an embodiment, one of the first memory device 121 and the second memory device 123 may be SRAM, and the other thereof may be DRAM. However, a configuration of the buffer memory device 120 is not limited to the above configuration.

FIGS. 2A to 2C are diagrams for describing a buffer management method using a scatter-gather buffer way according to an embodiment of the present disclosure.

Representative examples of a way (i.e., a mode or method) in which the buffer memory device 120 is managed may include a ring buffer way and a scatter-gather way.

When data for which a write request has been made by the external device are programmed into the storage device 200, data for which the program has failed may remain in the buffer memory device 120. Data that have been programmed normally may remain or might not remain in the buffer memory device 120 depending on a way in which the buffer memory device 120 is managed.

For example, if the buffer memory device 120 is managed in the ring buffer way, when data that have been buffered in the buffer memory device 120 are programmed into the storage device 200 normally, the memory controller 100 may release a slot of the storage device 200 in which the buffered data have been stored. However, the memory controller 100 may release the slot in the sequence of the data that have been buffered in the buffer memory device 120. That is, in the ring buffer way, when a program for data that have been buffered in the buffer memory device 120 fails, the memory controller 100 may maintain (i.e., keep) the data for which the program has failed and data that have been subsequently buffered in the buffer memory device 120 as a valid state regardless of a program success.

For example, if the buffer memory device 120 is managed in the scatter-gather way, the memory controller 100 may delete, from the buffer memory device 120, data that have been programmed normally, and may maintain data for which the program has failed in the buffer memory device 120.

FIG. 2A illustrates a scatter-gather buffer memory device 1251 and a status table 1253 of the scatter-gather buffer memory device 1251.

Illustratively, the scatter-gather buffer 1251 may include regions corresponding to first to eighth indices INDEX1 to INDEX8, respectively. The memory controller 100 may buffer first to eighth data DATA 1 to DATA 8 in the scatter-gather buffer memory device 1251.

The memory controller 100 may indicate the regions of the scatter-gather buffer memory device 1251 as the indices INDEX by dividing the regions. The memory controller 100 may write, in the status table 1253, status information STATUS indicating whether data have been buffered in a region corresponding to each index INDEX and information DATA with regard to data that have been buffered in the region corresponding to the index INDEX. For example, the memory controller 100 may write a value "1" in the status information STATUS if data have been buffered in a region corresponding to an index INDEX, and may write a value "0" if data have not been buffered in a region corresponding to an index INDEX.

Referring to FIG. 2A, after buffering the first to eighth data DATA 1 to DATA 8 in regions corresponding to the first to eighth indices INDEX 1 to INDEX 8 of the scatter-gather buffer memory device 1251, respectively, the memory controller 100 may write the value "1" in all pieces of the status information STATUS of the status table 1253 corresponding to the first to eighth indices INDEX 1 to INDEX 8, respectively. Furthermore, the memory controller 100 may write the first to eighth data DATA 1 to DATA 8 that have been buffered in the regions corresponding to the first to eighth indices INDEX 1 to INDEX 8 of the scatter-gather buffer memory device 1251, respectively, in the pieces of data information DATA of the status table 1253 corresponding to the first to eighth indices INDEX 1 to INDEX 8.

FIG. 2B illustrates a scatter-gather buffer memory device 1261 and a status table 1263 after a program is performed on the buffered data normally.

When the storage device 200 programs data that have been buffered in the scatter-gather buffer memory device 1261 normally regardless of the sequence of the data buffered in the scatter-gather buffer memory device 1261, the memory controller 100 may delete the data that have been programmed normally from the scatter-gather buffer memory device 1261.

Referring to FIG. 2B, if a program operation for the first data DATA 1 that have been buffered in the region corresponding to the first index INDEX 1 of the scatter-gather buffer memory device 1261 has failed and a program operation for the second data DATA 2 that have been buffered in the region corresponding to the eighth index INDEX 8 of the scatter-gather buffer memory device 1261 has been successful, the memory controller 100 may delete, from the scatter-gather buffer memory device 1261, the second data DATA 2 for which the program operation has been successful although the second data DATA 2 have been buffered after the first data DATA 1, and may maintain (i.e., keep) the first data DATA 1 for which the program operation has failed in the scatter-gather memory device 1261. The memory controller 100 may change the status information STATUS corresponding to the eighth index INDEX 8 of the status table 1263 into the value "0", and may change the data information DATA corresponding to the eighth index INDEX 8 of the status table 1263 into a NULL value.

FIG. 2C illustrates a scatter-gather buffer memory device 1271 and a status table 1273 after new data provided by the external device are buffered after the buffered data are deleted.

After deleting the second data DATA 2, the memory controller 100 may buffer ninth data DATA 9, that is, new data provided by the external device, in the region corresponding to the eighth index INDEX 8 of the scatter-gather buffer memory device 1271. The memory controller 100 may update the status table 1273 by changing the data information DATA corresponding to the eighth index INDEX 8 of the status table 1273 into ninth data DATA 9 and changing the status information STATUS corresponding to the eighth index INDEX 8 of the status table 1273 into the value "1".

In the case of the ring buffer way, data that are subsequently buffered in the buffer memory device 120 are maintained in the buffer memory device 120 regardless of whether a program operation for the data that are subsequently buffered is successful until data that have been previously buffered in the buffer memory device 120 are successfully programmed.

In the case of the scatter-gather way, a limited buffer space can be efficiently managed because data for which a program is successful are deleted from the buffer memory device 120 and data for which a program fails are maintained in the buffer memory device 120, regardless of the sequence of the data that have been buffered.

The memory controller 100 may be configured to reprogram data for which a program has failed based on a sequence that is requested by the external device by using only data that remain in the buffer memory device 120.

FIG. 3 is a diagram illustrating a configuration of a memory controller 100-1 according to an embodiment of the present disclosure.

Referring to FIG. 3, the memory controller 100-1 may include a command conversion circuit 151, a buffer manager 117, a mapping table manager 153, and a buffer memory device 120-1.

The command conversion circuit 151 may assign sequence numbers to commands that are received from the external device in the sequence in which the commands have been received, and may classify the commands based on the attributes of the commands.

In an embodiment, the buffer memory device 120-1 may be managed in the multi-buffer way in which the buffer memory device 120-1 is divided into a plurality of buffer spaces. The command classified by the command conversion circuit 151 may be buffered in a buffer space corresponding to the attributes of the command.

The attributes of the command may include normal attributes corresponding to a common write operation and write boost attributes corresponding to an operation of preferentially storing data or storing data at a fast speed compared to other data, but the embodiments of the present disclosure are not limited thereto.

The buffer manager 117 may divide the buffer memory device 120-1 into a first buffer 310, a second buffer 320, and a mapping table 330. The first buffer 310 and the second buffer 320 may be collectively called a write buffer.

In an embodiment, the memory controller 100-1 may control the first buffer 310 to buffer write data having normal attributes, and may control the second buffer 320 to buffer write data having write boost attributes. Map data, that is, a set of mapping information between a logical address that is used by the external device and a physical address that is used by the storage device 200, may be buffered in the mapping table 330.

The mapping information may mean a pair of one physical address and a logical address corresponding to the physical address. The map data may mean a set of a plurality of pieces of mapping information.

When a set flush event is triggered, the buffer manager 117 may flush, into the storage device 200, write data that have been stored in the first buffer 310 or the second buffer 320 or map data that have been stored in the mapping table 330.

The event for flushing the write data may include a case in which one of the first buffer 310 or the second buffer 320 is full, a case in which logical addresses have been mapped to all physical addresses included in the mapping table 330, and a case in which a write command for write data having a capacity greater than the remaining capacity of the buffer memory device 120-1 is received from the external device.

After the start of a write operation, the mapping table manager 153 may load, onto the mapping table 330, map data including information with regard to the physical addresses of an open block allocated to the storage device 200. The mapping table manager 153 may update the mapping table 330 by mapping logical addresses to physical addresses sequentially stored in the mapping table 330 in a sequence in which the write commands are received from the external device.

That is, when receiving the write commands, the mapping table manager 153 may map the logical addresses to the write commands, respectively, in the sequence in which the write commands have been received by the mapping table 330 including the physical addresses that have been sequentially stored.

Figure 4:
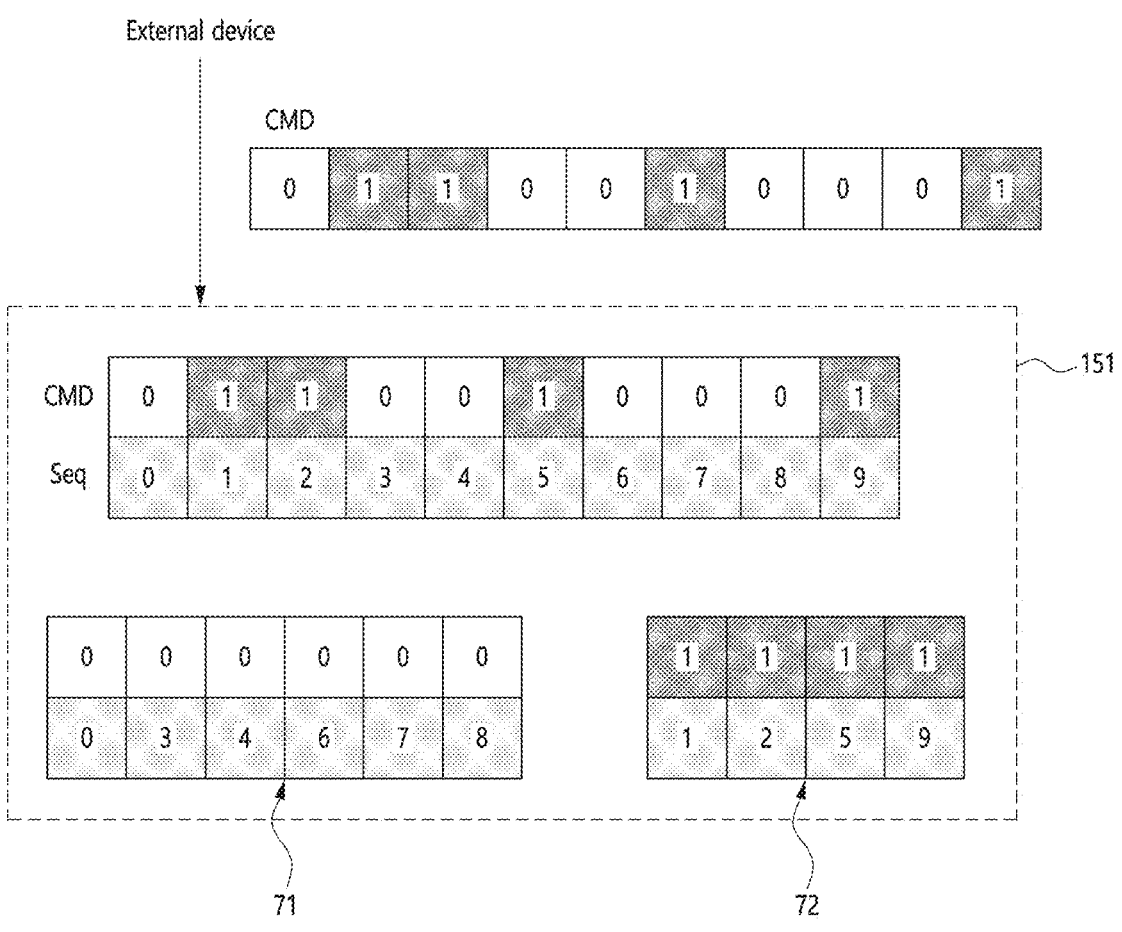
FIG. 4 is a diagram for describing a buffer management method using a multi-buffer way according to an embodiment of the present disclosure.

FIG. 4 is a diagram for describing a buffer management method using the multi-buffer way according to an embodiment of the present disclosure.

Referring to FIG. 4, the command conversion circuit 151 may classify a command CMD that is received from the external device based on its attributes, and may add a tag 0 or 1 to the command based on the classified attributes. For example, the command conversion circuit 151 may classify the attributes of write data into normal attributes and write boost attributes, may assign the tag "0" to write data having the normal attributes, and may assign the tag "1" to write data having the write boost attributes.

The buffer manager 117 may control the buffer memory device 120-1 so that data classified by the command conversion circuit 151 are stored in respective buffer spaces. For example, the buffer manager 117 may control the buffer memory device 120-1 so that write data 71 having attributes corresponding to the tag "0" are stored in the first buffer 310 and write data 72 having attributes corresponding to the tag "1" are stored in the second buffer 320.

The command conversion circuit 151 may assign a sequence number Seq to each command CMD in the sequence in which the commands CMD have been received from the external device. In this case, the sequence number Seq may indicate the sequence of the command that has been input to the memory controller 100, and may be used to divide old data and new data. FIG. 4 illustrates 10 commands to which sequence numbers Seq from "0" to "9" have been assigned, respectively. The command CMD having the sequence number Seq of "0" may be a command CMD that has been earlier input to the memory controller 100 than the command having the sequence number Seq of "9".

Figure 5:
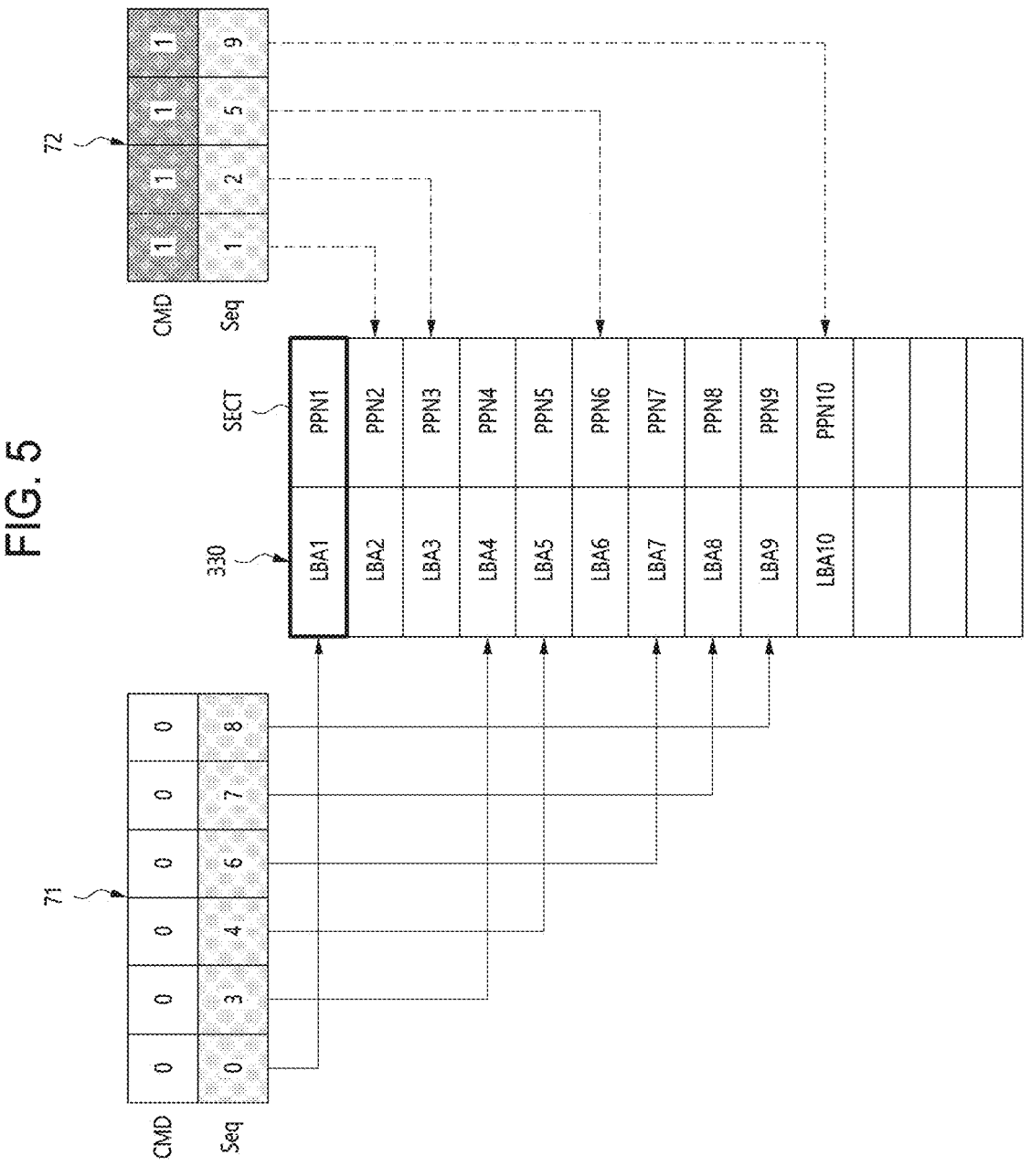
FIG. 5 is a diagram for describing a method of managing a mapping table according to an embodiment of the present disclosure.

FIG. 5 is a diagram for describing a method of managing a mapping table according to an embodiment of the present disclosure.

Referring to FIG. 5, the mapping table 330 may be divided into a plurality of sections SECT.

When receiving write commands CMD from the external device, the mapping table manager 153 may load, onto the mapping table 330, map data in which the physical addresses PPN1 to PPN10 of an open block have been sequentially stored, and may sequentially allocate the sections SECT of the mapping table 330 to the physical addresses PPN1 to PPN10, respectively, in the sequence in which the write commands CMD have been received. Mapping information to which logical addresses LBA 1 to LBA 10 corresponding to allocated write commands CMD, respectively, have been mapped may be stored in the physical addresses PPN1 to PPN10 of the respective sections SECT.

The mapping table manager 153 may sequentially allocate the sections SECT of the mapping table 330 to the sequence numbers Seq, respectively, so that the sections SECT correspond to the sequence of the sequence numbers Seq that have been assigned to the commands CMD.

As described above, when receiving the write commands CMD and the logical addresses LBA 1 to LBA 10 corresponding to the write commands CMD from the external device, the memory controller 100 may update the mapping table 330 by mapping the received logical addresses LBA 1 to LBA 10 to the physical addresses PPN1 to PPN10, respectively.

The mapping table 330 may have a physical address to logical address (P2L) form including information with regard to the corresponding logical addresses LBA 1 to LBA 10 in the sequence of the physical addresses PPN1 to PPN10.

In an embodiment, when write data that have been buffered in the first buffer 310 and/or the second buffer 320 are flushed into the storage device 200, the mapping table manager 513 may back up, in the storage device 200, map data corresponding to the flushed write data.

For example, when the first buffer 310 in which write data corresponding to a command having attributes of "0" are stored as flushed, the mapping table manager 153 may back up, in the storage device 200, map data having the sequence numbers Seq of "0", "3", "4", "6", "7", and "8" that have been stored in the first buffer 310.

Figure 6:
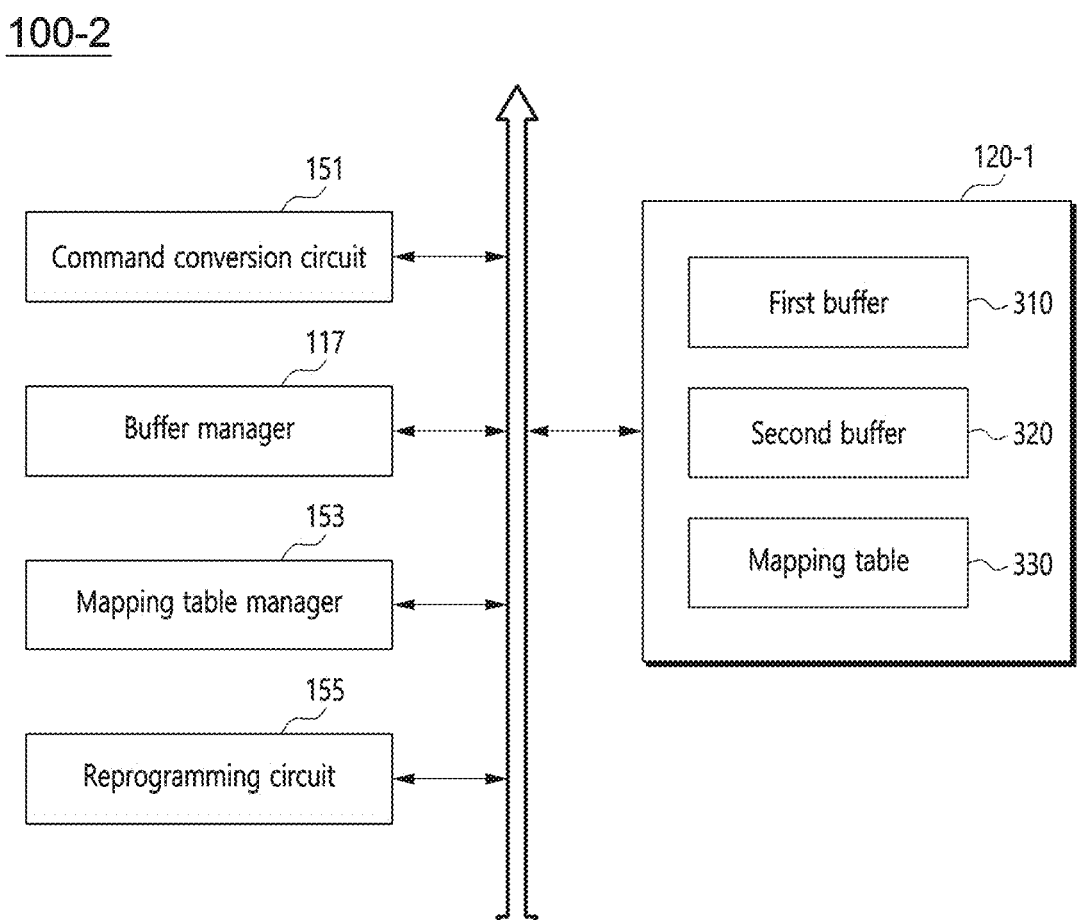
FIG. 6 is a diagram illustrating a configuration of a memory controller according to an embodiment of the present disclosure.

FIG. 6 is a diagram illustrating a configuration of a memory controller 100-2 according to an embodiment of the present disclosure.

Referring to FIG. 6, the memory controller 100-2 may include a command conversion circuit 151, a buffer manager 117, a mapping table manager 153, a reprogramming circuit 155, and a buffer memory device 120-1.

The command conversion circuit 151, the buffer manager 117, the mapping table manager 153, and the buffer memory device 120-1 may be constructed identically with or similar to those described with reference to FIG. 3.

The command conversion circuit 151 may assign sequence numbers to commands that are received from the external device, respectively, in the sequence in which the commands have been received, and may classify the commands based on the attributes of the commands.

When receiving write commands, the mapping table manager 153 may load, onto the mapping table 330, mapping information including the physical addresses of an allocated open block in order to write data, and may update the mapping table 330 by mapping logical addresses to the physical addresses of the mapping table 330, respectively, in the sequence in which the write commands have been received.

When a flush event is triggered, the buffer manager 117 may control the storage device 200 so that the storage device 200 programs write data that have been buffered in the buffer memory device 120-1 by flushing the write data into the storage device 200.

The storage device 200 may program the write data and transmit information with regard to whether the program is successful to the memory controller 100-2 as a response.

When the program is successful, the mapping table manager 153 may back up, in the storage device 200, map data corresponding to the flushed write data.

When the program fails, an error handling operation through the reprogramming circuit 155 may be performed.

The reprogramming circuit 155 may reprogram write data for which the program has failed into the storage device 200.

When a program failure is reported by the storage device 200, the reprogramming circuit 155 may back up, in the storage device 200, map data, that is, a set of invalidated mapping information that is buffered in the mapping table 300 and that is related to a write command that has failed.

The reprogramming circuit 155 may generate a reprogram command based on the failed write command. Accordingly, an open block into which the write data corresponding to the failed write command will be programmed may be allocated. The reprogramming circuit 155 may update mapping information of the mapping table 330 based on a physical address corresponding to the allocated open block, and may request a program from the storage device 200 based on the updated mapping information.

Accordingly, map data that have been matched with the sequence in which write commands have been received may be stored in the mapping table 330.

FIGS. 7A to 7D are diagrams for describing an operation of the reprogramming circuit according to an embodiment of the present disclosure.

Figures 7A, 7B:
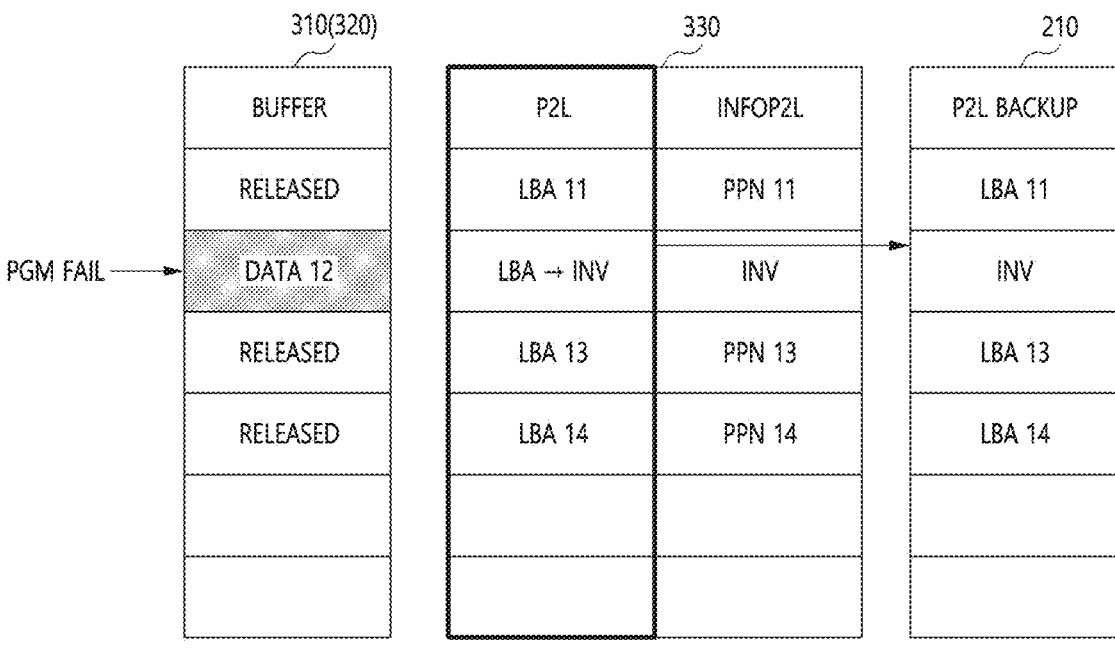
FIGS. 7A to 7D are diagrams for describing an operation of a reprogramming circuit according to an embodiment of the present disclosure.

Referring to FIG. 7A, first to fourth write data DATA 11 to DATA 14 may be buffered in the buffer 310 or 320 in the sequence in which write commands have been received. Map data P2L, that is, a set of mapping information corresponding to the first to fourth write data DATA 11 to DATA 14, may be stored in the mapping table 330.

The map data P2L of the mapping table 330 may be generated by updating logical addresses LBA 11 to LBA 14 in the sequence in which the write commands have been received with respect to the physical addresses PPN 11 to PPN 14 of an open block into which the write data will be programmed.

When a flush event is triggered, the write data of the buffer 310 or 320 may be flushed into the storage device 200. The storage device 200 may transmit information with regard to whether the program is successful to the memory controller 100 as a response.

In this case, the program for the write data DATA 11, DATA 13, and DATA 14 may be successful, and the program for the write data DATA 12 may fail.

Referring to FIG. 7B, the buffer manager 117 may release slots of the buffer 310 or 320 corresponding to the write data DATA 11, DATA 13, and DATA 14 for which the program has been successful, and may maintain (i.e., keep) the write data DATA 12 for which the program has failed in the buffer 310 or 320.

The reprogramming circuit 155 may invalidate (INV) mapping information corresponding to a write command for which a program has failed, and may back up map data of the mapping table 330, including the invalidated mapping information, in a map block 210 of the storage device 200.

The reprogramming circuit 155 may generate and execute a reprogram command for the write data DATA 12 for which the program has failed, so that an open block may be allocated.

Figure 7C:
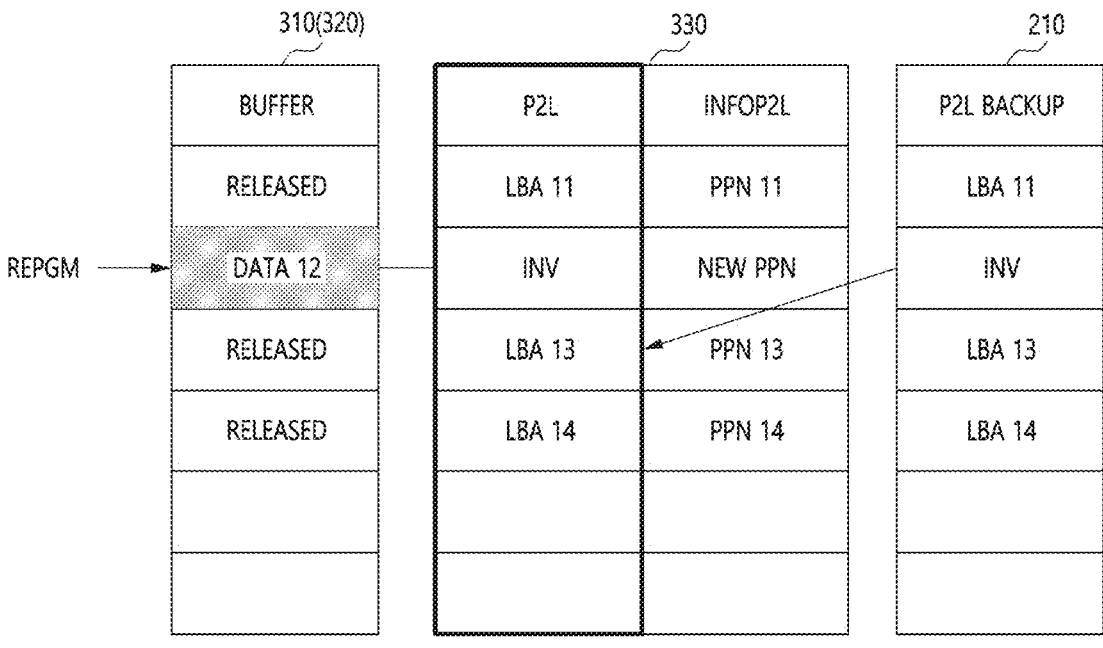

Referring to FIG. 7C, the reprogramming circuit 155 may load map data from the map block 210 to the mapping table 330. Furthermore, the reprogramming circuit 155 may update mapping information within the mapping table 330 by storing a physical address New PPN of an open block that has been allocated for reprogram in accordance with the invalidated logical address LBA 12.

The reprogramming circuit 155 may request a reprogram REPGM from the storage device 200 based on the updated map data.

Figure 7D:
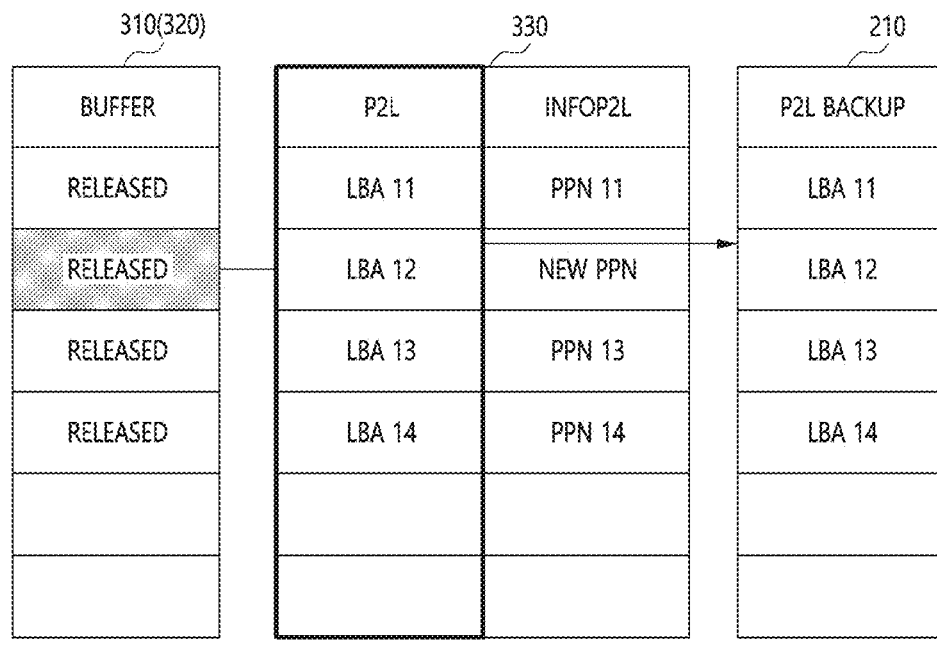

When the reprogram for the second data DATA 12 is successful, as illustrated in FIG. 7D, a slot in which the second data DATA 12 of the buffer 310 or 320 has been stored may be released, and the updated map data may be backed up in the map block 210.

As a result, map data matched with the sequence in which the write commands have been received may be stored in the map block 210.

Figure 8:
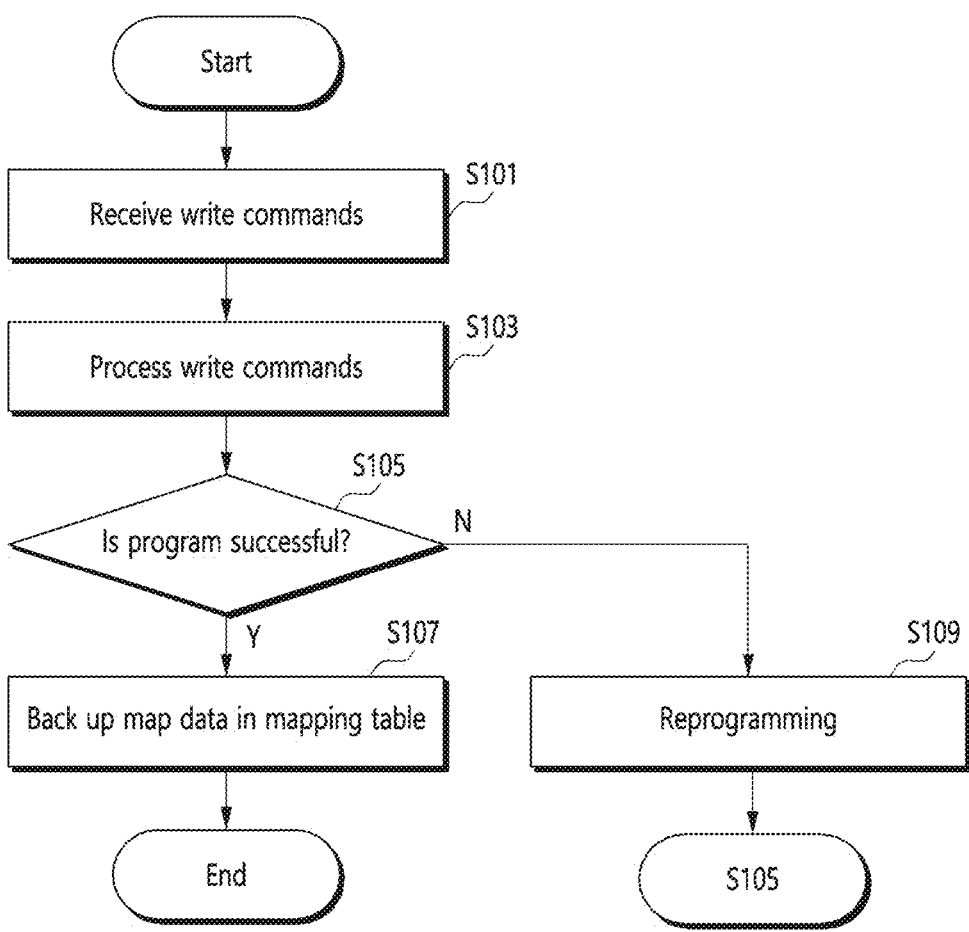
FIGS. 8 to 10 are flowcharts for describing an operating method of the data storage apparatus according to an embodiment of the present disclosure.
Figure 9:
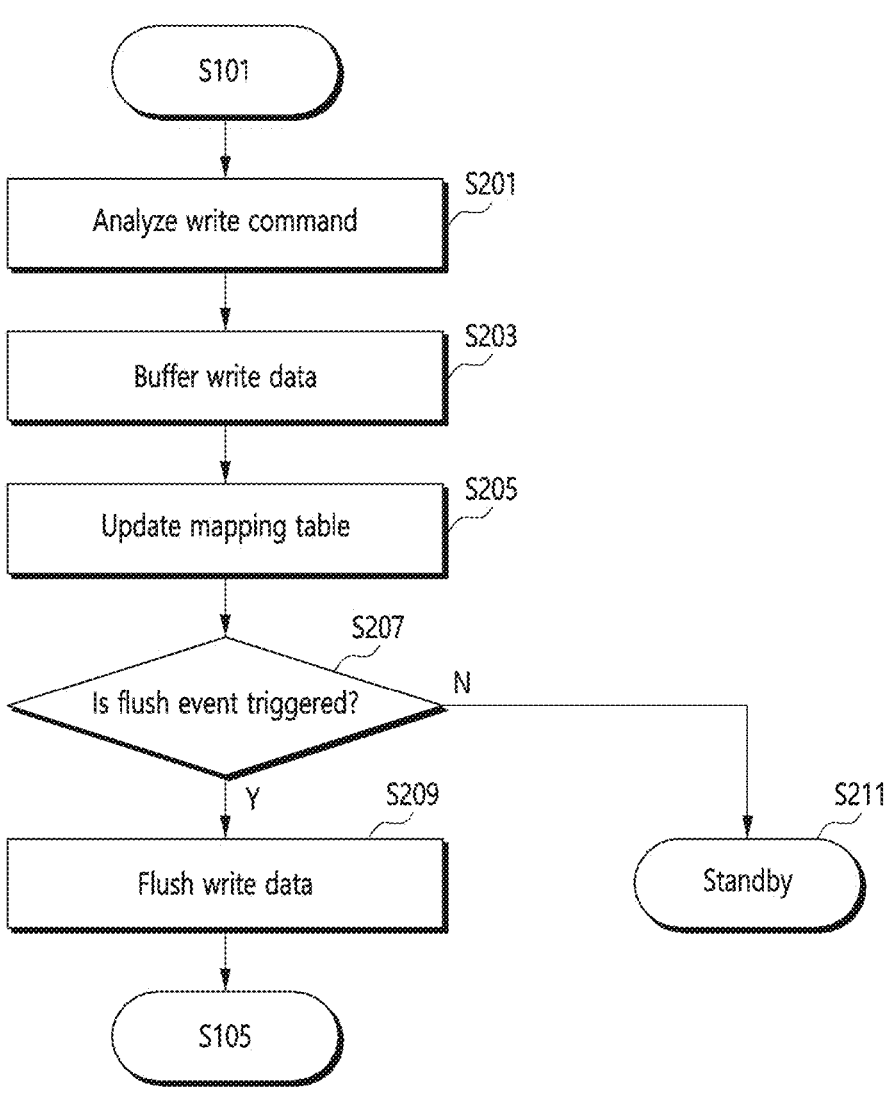
Figure 10:
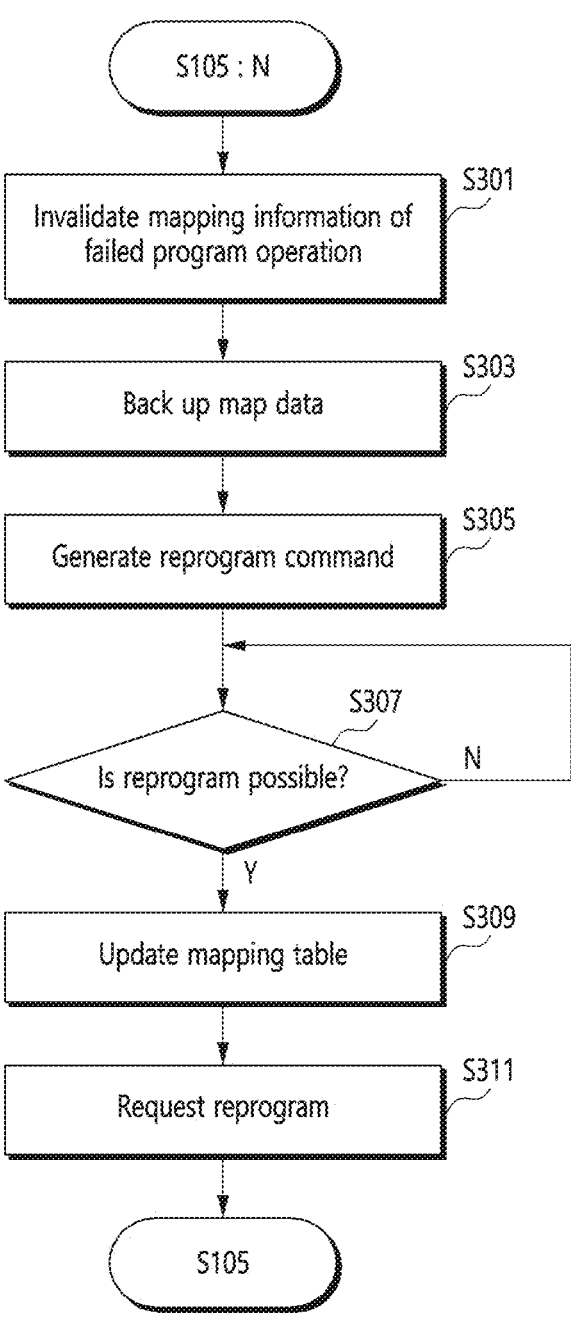

FIGS. 8 to 10 are flowcharts for describing an operating method of the data storage apparatus according to an embodiment of the present disclosure.

FIG. 8 is a flowchart for describing a write method according to an embodiment of the present disclosure.

When receiving a write command from the external device (S101), the memory controller 100 may request a program operation from the storage device 200 by processing the write command (S103). The process S103 of processing a write command will be described later with reference to FIG. 9.

The memory controller 100 may check whether the program operation according to the processing of the write command has been successful (S105). When the program operation is successful (i.e., 'Y' in S105), the memory controller 100 may back up map data of the mapping table 330 in the storage device 200 (S107). Furthermore, the memory controller 100 may release a slot of a buffer in which write data for which the program operation has been successful have been stored.

When the program operation fails (i.e., 'N' in S105), the memory controller 100 may maintain write data for which the program operation has failed in a slot of the buffer, may reprogram the write data (S109), and may check whether a program operation for the write data is successful (S105).

The reprogram process S109 will be described later with reference to FIG. 10.

FIG. 9 is a flowchart for describing a process of processing a write command according to an embodiment of the present disclosure.

The memory controller 100 may analyze a write command that is received from the external device. For example, the memory controller 100 may assign a sequence number to each command in the sequence in which the commands have been received, and may classify the commands based on their attributes (S201).

A command corresponding to the write command may be buffered in a buffer space corresponding to the classified attributes based on its sequence number (S203).

The memory controller 100 may allocate an open block into which write data will be programmed, and may update the mapping table 330 (S205). In an embodiment, the memory controller 100 may load, onto the mapping table 330, map data including information with regard to the physical addresses of an allocated open block, and may update the mapping table 330 by storing logical addresses in the mapping table 330 in the sequence in which write commands have been received.

The memory controller 100 may determine whether an event for flushing the write data is triggered (S207).

The event for flushing the write data may include a case in which one of the first buffer 310 or the second buffer 320 is full, a case in which logical addresses have been mapped to all physical addresses included in the mapping table 330, and a case in which a write command for write data having a capacity greater than the remaining capacity of the buffer memory device 120-1 is received from the external device.

When the event for flushing the write data is triggered (i.e., 'Y' in S207), the memory controller 100 may flush the write data into the storage device 200, that is, may request a program from the storage device 200 (S209), and may check whether the program is successful (S105).

When the event for flushing the write data is not triggered (i.e., 'N' in S207), the state of the memory controller 100 may transition to a standby state (S211).

FIG. 10 is a flowchart for describing a reprogram process according to an embodiment of the present disclosure.

When the storage device 200 reports that a program operation for write data has failed, the memory controller 100 may invalidate mapping information corresponding to the failed program operation (S301).

The memory controller 100 may back up, in the storage device 200, map data of the mapping table 330 including the invalidated mapping information (S303).

The memory controller 100 may generate a reprogram command for the write data for which the program operation has failed (S305), and may determine whether the write data are in the state in which a reprogram for the write data is possible (S307). For example, the memory controller 100 may determine whether the memory controller 100 is in an idle state.

When the write data are not in the state in which the reprogram for the write data is possible (i.e., 'N' in S307), the memory controller 100 may continuously monitor the write data (S307). When the write data are in the state in which the reprogram for the write data is possible (i.e., 'Y' in S307), the memory controller 100 may update the mapping table 330 by allocating an open block on which a reprogram will be performed (S309).

In order to update the mapping table 330, the memory controller 100 may load map data of the storage device 200 onto the mapping table 330, and may change mapping information of the mapping table 330 based on physical addresses of an open block that has been allocated for the reprogram.

The memory controller 100 may request the reprogram from the storage device 200 based on the updated mapping information (S311). Furthermore, the memory controller 100 may check whether the program has been successful (S105).

When the reprogram is successful, the memory controller 100 may back up map data including the updated mapping information in the storage device 200. Accordingly, map data that are matched with the sequence in which write commands have been received may be stored in the storage device 200.

In the scatter-gather buffer way configured to release a write buffer corresponding to a write command by which a program has been successful, the memory controller 100 may map write commands to physical addresses in the sequence in which the write commands have been received.

When the data of a write buffer is flushed, if a program operation for some write data fails, a mapping table may be updated as described above. Accordingly, only a program operation that has failed can be selectively reprogrammed, and a program sequence requested by the external device can be guaranteed.

As described above, those skilled in the art to which the present technology pertains may understand that the present technology may be implemented in various other forms without departing from the technical spirit or essential characteristics of the present technology. Accordingly, it is to be understood that the aforementioned embodiments are illustrative from all aspects not being limitative. The scope of the present technology is defined by the appended claims rather than by the detailed description, and all modifications or variations derived from the meanings and scope of the claims and equivalents thereof should be understood as being included in the scope of the present technology. Furthermore, the embodiments may be combined to form additional embodiments.

What is claimed is:

1. A data storage apparatus comprising:
   a storage device;
   a buffer memory device configured to temporarily store write data and a mapping table; and
   a memory controller configured to control the storage device to program the write data,
   wherein the memory controller is configured to
      when externally receiving write commands including logical addresses, store the logical addresses by mapping the logical addresses to physical addresses sequentially stored in the mapping table in a sequence in which the write commands are received, and
      when a first program operation corresponding to a first write command fails and a second program operation corresponding to a second write command succeeds, invalidate first mapping information corresponding to the first write command and update the first mapping information by allocating a new physical address to a logical address included in the first write command in response to a reprogram command generated with respect to the first write command,
      wherein the memory controller comprises a reprogramming circuit configured to, when the first program operation fails, invalidate the first mapping information, store first map data including the first mapping information invalidated and valid second mapping information corresponding to the second write command in the storage device, and update the first mapping information with the new physical address by loading the first map data onto the mapping table in response to the reprogram command.

2. The data storage apparatus of claim 1, wherein the memory controller is configured to
   invalidate write data for at least one successful program operation in the buffer memory device, and
   keep write data for at least one failed program operation in the buffer memory device.

3. The data storage apparatus of claim 1, wherein the memory controller is configured to keep in the buffer memory device only write data for the at least one failed program operation regardless of the sequence in which the write commands are received.

4. The data storage apparatus of claim 1, wherein the memory controller comprises a buffer manager configured to control the buffer memory device in a scatter-gather way.

5. An operating method of a data storage apparatus, the operating method comprising:

temporarily storing, by a memory controller, write data and a mapping table in a buffer memory device in response to write commands including logical addresses that are externally received;

storing, by the memory controller, logical addresses by mapping the logical addresses to physical addresses sequentially stored in the mapping table in a sequence in which the write commands are received;

controlling, by the memory controller, a storage device to program the write data;

generating, by the memory controller, first mapping information corresponding to a first write command and second mapping information corresponding to a second write command;

invalidating, by the memory controller, the first mapping information according to a determination that a first program operation corresponding to the first write command fails and a second program operation succeeds;

storing, by the memory controller, first map data including the first mapping information that has been invalidated and the second mapping information corresponding to the second write command in the storage device;

loading, by the memory controller, the first map data onto the mapping table in response to a reprogram command generated with respect to the first write command; and updating, by the memory controller, the first mapping information by allocating a new physical address to a logical address included in the first write command.

6. The operating method of claim 5, further comprising invalidating, by the memory controller, write data for at least one successful program operation in the buffer memory device, and keeping write data for at least one failed program operation in the buffer memory device.

7. The operating method of claim 5, further comprising keeping, by the memory controller, only write data for at least one failed program operation in the buffer memory device regardless of the sequence in which the write commands are received.

8. The operating method of claim 5, further comprising controlling, by the memory controller, the buffer memory device in a scatter-gather way.

9. A data storage apparatus comprising:

a storage device including a plurality of memory blocks;

a buffer memory device configured to temporarily store first write data and second write data;

a buffer manager configured to manage the buffer memory device in a scatter-gather way; and a memory controller configured to control the storage device to program the first write data and the second write data that are sequentially provided, invalidate first mapping information corresponding to the first write data when a first program operation of the first write data fails and a second program operation of the second write data is successful, and update the first mapping information by allocating a new block into which the first data are to be reprogrammed, wherein the memory controller comprises a reprogramming circuit configured to, when the first program operation corresponding to the first write data fails, invalidate the first mapping information, store first map data including the first mapping information invalidated and valid second mapping information corresponding to the second write command in the storage device, and update the first mapping information with a new physical address by loading the first map data onto a mapping table of the buffer memory device in response to a reprogram command.

* * * * *